US007460944B2

(12) United States Patent
Baumann et al.

(10) Patent No.: US 7,460,944 B2
(45) Date of Patent: Dec. 2, 2008

(54) DAMPING DEVICE AND DAMPING METHOD FOR SUPPRESSING TORSIONAL OSCILLATIONS IN A DRIVETRAIN

(75) Inventors: Julian Baumann, Karlsruhe (DE); Thomas Schlegl, Regensburg (DE); Dara Daniel Torkzadeh, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 796 days.

(21) Appl. No.: 10/982,482

(22) Filed: Nov. 5, 2004

(65) Prior Publication Data

US 2005/0182545 A1 Aug. 18, 2005

(30) Foreign Application Priority Data

Nov. 7, 2003 (DE) ................................ 103 51 958

(51) Int. Cl.
*G06F 7/00* (2006.01)

(52) U.S. Cl. ......................... 701/53; 701/110; 701/111; 123/357; 123/406.24; 123/406.25; 123/436

(58) Field of Classification Search ................... 701/53, 701/110, 111; 123/357, 406.24, 406.25, 123/436
See application file for complete search history.

(56) References Cited

U.S. PATENT DOCUMENTS

| | | | | |
|---|---|---|---|---|
| 6,022,294 A | | 2/2000 | Saito et al. | 477/169 |
| 6,065,449 A | * | 5/2000 | Fukuma | 123/436 |
| 6,182,003 B1 | | 1/2001 | Maier-Landgrebe | 701/84 |
| 6,202,630 B1 | | 3/2001 | Yip | 123/352 |
| 6,524,223 B2 | | 2/2003 | Graf et al. | 477/109 |
| 6,675,087 B2 | | 1/2004 | Cullen | 701/110 |
| 2003/0069776 A1 | | 4/2003 | Cullen | 705/9 |

FOREIGN PATENT DOCUMENTS

| | | |
|---|---|---|
| DE | 19851548 | 11/1999 |
| DE | 10236202 | 3/2003 |
| EP | 0382872 | 5/1994 |
| EP | 0924421 | 6/1999 |
| EP | 1260693 | 11/2002 |
| GB | 2262818 | 6/1993 |
| GB | 2262818 A * | 6/1993 |

OTHER PUBLICATIONS

European Patent Search Report Application No. 04105189.7 (4 pages), Mailing Date Mar. 10, 2005.

* cited by examiner

*Primary Examiner*—Khoi H. Tran
*Assistant Examiner*—Marie A Weiskopf
(74) *Attorney, Agent, or Firm*—Baker Botts L.L.P.

(57) ABSTRACT

A damping device comprises a device (4, 7) for determining a mechanical state variable ($\Delta\alpha_{MODEL}$, $\Delta\alpha_{ACTUAL}$) reproducing the torsion of a drivetrain (3) of an internal combustion engine (1) and an actuator (2) to activate an internal combustion engine (1) with a control variable as a function of the mechanical state variable ($\Delta\alpha_{MODEL}$, $\Delta\alpha_{ACTUAL}$). It is proposed that the mechanical state variable ($\Delta\alpha_{MODEL}$, $\Delta\alpha_{ACTUAL}$) be determined by a predictor element (4) that contains a model of the drivetrain (3) and/or the internal combustion engine (1).

22 Claims, 2 Drawing Sheets

DAMPING DEVICE AND DAMPING METHOD FOR SUPPRESSING TORSIONAL OSCILLATIONS IN A DRIVETRAIN

PRIORITY

This application claims priority to German application no. 103 51 958.0 filed Nov. 7, 2003.

TECHNICAL FIELD OF THE INVENTION

The invention relates to a damping device and a damping method.

Technical improvements, particularly in the case of the direct injection technology, have allowed the dynamics of developing the power of internal combustion engines to be greatly improved. This results in marked jumps in the load on the drivetrains of motor vehicles used by these internal combustion engines to drive the vehicle. Load jumps represent a major impetus in the frequency range for the oscillatable drivetrain system. As a result, low frequency torsional oscillations can be triggered in the drivetrain. The eigenform of the lowest torsional oscillation consists of an angular rotation of the engine in relation to the driven wheels. Such an oscillation is particularly noticeable as a jerking motion in the longitudinal direction of the vehicle and considerably reduces the drivability of the motor vehicle. In addition, both these oscillations and the load jumps themselves represent a high load on the drivetrain, thereby increasing the wear and tear and possibly causing material fatigue.

A known option for suppressing the oscillations and their negative effects is to filter out the oscillation from a measuring signal recorded by a rpm sensor in the internal combustion engine and to apply a counter torque to the oscillation via the internal combustion engine. For this, the signal of the rpm sensor is filtered and phase-shifted by means of a low pass.

However, the method described has the disadvantage that it must be operated close to the stability limit for it to be effective.

Particularly problematical here is the fact that the damping torque is applied with a frequency that corresponds to the torsional resonance frequency. For this reason, even small errors in calculating the counter torque or small changes in the mechanical behavior of the drivetrain can lead to instabilities under some circumstances. Therefore, it must be taken into consideration that the mechanical properties of the drivetrain generally change over the service life of a motor vehicle, for example, wear and tear of the gears or a change in the elastic properties of shaft couplings. As a result, an additional disadvantage of the method is the fact that it is only possible to react to oscillations which already exist, therefore, damping only starts if the high load on the drivetrain is already present.

SUMMARY OF THE INVENTION

An object of the invention is thus to suppress oscillations in the drivetrain as cost-effectively as possible, in which case high drivetrain loads and jerking motions of the vehicle are especially to be avoided.

The object of the invention can be achieved by a damping device for suppressing torsional oscillations in a drivetrain of an internal combustion engine, comprising a device for determining a mechanical state variable reproducing a torsion of the drivetrain, and an actuator for activating the internal combustion engine with a control variable as a function of the determined mechanical state variable, wherein the determining device comprises a predictor element that contains a model of the drivetrain and/or the internal combustion engine and determines the mechanical state variable as a response of the drivetrain and/or the internal combustion engine to the control variable on the basis of the model.

The object can also be achieved by an engine control comprising a damping device for suppressing torsional oscillations in a drivetrain of an internal combustion engine, comprising a device for determining a mechanical state variable reproducing the torsion of the drivetrain, and an actuator for activating the internal combustion engine with a control variable as a function of the determined mechanical state variable, wherein the determining device has a predictor element that contains a model of the drivetrain and/or the internal combustion engine and determines the mechanical state variable as a response of the drivetrain and/or the internal combustion engine to the control variable on the basis of the model.

The object may further be achieved by a damping method to suppress torsional oscillations in the drivetrain of an internal combustion engine comprising the steps of determining a mechanical state variable representing the torsion of the drivetrain, activating the internal combustion engine with a control variable as a function of the mechanical state variable determined, and determining the mechanical state variable as a response to the control variable on the basis of a model of the drivetrain and/or the internal combustion engine.

The invention is based on the physical knowledge that the internal combustion engine, the drivetrain or the rpm sensor have an idle time which makes it more difficult to regulate the damping torques for suppressing torsional oscillations in the drivetrain. For example, an increased supply of fuel does not immediately lead to an increased drive torque of the internal combustion engine because the amount of fuel is injected into the combustion chambers during fixed-cycle operations, giving rise to time losses.

Therefore, within the framework of the invention, a predictor element is advantageously used to determine a mechanical state variable of the drivetrain as the response to a control variable. This has the advantage that the control variable can be specified depending on the mechanical state variable determined and the internal combustion engine is activated with the control variable thus modified. This means that the excitation of torsional oscillations is already suppressed.

The control variable for the internal combustion engine can, for example, be the amount of fuel fed to the internal combustion engine. However it is also conceivable for other control variables such as, for example the throttle valve actuation to be influenced.

The mechanical state variable preferably reflects the change in torsion of the drivetrain over time in order to clearly distinguish the torsional oscillations from the other usual loads during operation.

The device according to the invention preferably takes into consideration the set transmission ratio of the gearbox and other transmissions in the drivetrain. In this way, the damping device can include a signal input to record a signal reproducing the transmission ratio of the gearbox.

The predictor element preferably features a model of the internal combustion engine and the drivetrain in order to determine the mechanical state variable. A model has the advantage that it makes possible a mathematical forecast of the mechanical response to given activations.

Preferably the model contained in the predictor element is essentially free from idle time. Because the internal combustion engine in particular has an idle time as a result of the combustion process, this has the advantage of gaining time. If before a regulation intervention, the actual response of the drivetrain to the control variable is awaited, further oscillation-inducing pulses can be generated by the control variable during the elapsed idle time without these being controlled. If, on the other hand, the response is calculated in real time, i.e. as quickly as allowed by the arithmetic unit of the model, torsional oscillations can already be suppressed in the initial stage or the excitation of torsional oscillations can be suppressed.

Preferably, the output of the predictor element is connected to the input of the transmission element which itself is connected on the output side to the actuator to influence the control variable on the basis of the state variable determined with the model. In this way, the transmission element suppresses an oscillation that would be set if the actuator activates the internal combustion engine with a state variable that was the basis of the calculation with the model of the drivetrain. Therefore, if the transmission element in this case determines that the mechanical state variable output by the model reproduces an oscillation, it will counteract this oscillation before this oscillation can actually occur.

Advantageously, the transmission element features a P-element or a PD-element. The P-element changes the control variable as a proportional function of the state variable determined. It thus corresponds to a known P-controller that has a proportional transmission ratio. Because the determination of the state variable by the predictor element, in essence, has no idle time, the proportional transmission characteristics of the P-element suppress the oscillations in the drivetrain in a stable manner. Alternatively, a PD-element can also be used that also changes or changes nothing but the control variable as a function of changing the determined state variable in time. The transmission ratio of the PD-element essentially corresponds to that of a PD-controller. In this way, the PD-element brings about a phase lead of the control variable compared to the state variable determined, as a result of which a stabilization is reached.

Advantageously, the damping device has a control loop to adapt the predictor element. The advantage of this is that the predictor element can be adapted to the changed conditions. Therefore, the predictor element can, for example, be changed depending on changes in the mechanical properties of the drivetrain so that it can reliably predict the response of the drivetrain to an activation of the internal combustion engine with a control variable after the mechanical properties of the drivetrain have been changed. In this case, the adaptation can, for example, take place by changing the parameters of the two-mass oscillator. In an advantageous embodiment of the invention, the control loop supports the model states. This allows interferences and model inaccuracies to be corrected immediately which increase the quality of the prediction of the predictor element.

Advantageously, the damping device features a measuring device for measuring the state variable of the drivetrain. As a result, the damping device receives information about the actual response of the drivetrain and the internal combustion engine to an activation with a control variable that is preferably known to the damping device. In this case, the measuring device can include an angular velocity sensor on one driven wheel, for example, the angular velocity sensor of an antilock braking system (ABS) that already exists. If, in addition, the rpm of the internal combustion engine and the transmission ratio of the drivetrain are taken into consideration, it is possible for a change in the torsion of the drivetrain over time to be determined. In addition, angular velocity sensors can also be used in the vicinity of the gearbox or elsewhere of the drivetrain to allow torsional oscillations in the drivetrain to be detected more precisely. It is also conceivable for the torsion of the drivetrain to be measured, with resistance strain gauges or magnetostrictive sensors for example.

If the measuring device features an idle time, an additional time advantage is obtained by determining the response of the drivetrain in the model that is essentially free from idle time. The measuring device to measure the rpm of a wheel can, for example, have an idle time because it must wait for a specific angular rotation of the wheel before the next measuring marker reaches a measuring point of the measuring device.

In a preferred embodiment the damping device includes an idle time unit to simulate the idle time of the internal combustion engine, the drivetrain or the measuring device. If the idle time element is connected on the input side to the predictor element then it is possible to calculate an idle time-affected state variable determined by the predictor element. This has the advantage that information about the state variable predicted by the predictor element is provided to the damping device at a point in time when this state variable should actually occur in the drivetrain. The idle time is preferably simulated as a function of the rpm of the internal combustion engine. The idle time can, for example, indirectly depend on the rpm in a linear manner. Taking the rpm into consideration has the advantage that the idle time can be determined precisely.

In a comparator of the damping device, a comparison is preferably undertaken between the measured state variable and the calculated idle time-affected state variable. This makes it possible to identify whether or not the state variable determined by the model of the predictor element matches the actual state variable occurring in the drivetrain. This represents a quality control of the model of the predictor element. In this case the comparator can check both the phase relationship and the amplitude of the calculated idle time-affected state variable.

Advantageously, an adaptation unit is connected to the output of the comparator. The object of this adaptation unit is to adapt the predictor element as a function of the comparison between the measured state variable and the calculated, idle time-affected state variable. For example, if the adaptation unit determines that a slight torsional oscillation is predicted by the predictor element, but that said oscillation is actually considerably greater in the drivetrain, the adaptation unit can influence the model of the drivetrain to the effect that the amplitude of the predicted response turns out higher when future calculations are made. Preferably, the adaptation unit does not immediately adapt the model of the drivetrain and the internal combustion engine in the case of a first error detection, but integrates the errors occurring over a longer period of time, for example, over minutes, hours or even weeks and months. In this way, the adaptation unit can identify whether or not the mechanical behavior of the drivetrain changes over a longer period of time and accordingly adapts the model of the drivetrain and the internal combustion engine. Preferably, the adaptation unit influences individual parameters of the model of the predictor element such as, for example, the damping or the rigidity of the spring of a two-mass oscillator. However, it can also be advantageous if the adaptation unit supports the model states. As a result, short-term model corrections can also be carried out which improve the prediction behavior of the model.

Preferably the control loop contains the predictor element, the idle time element, the measuring unit, the comparison element and the adaptation unit. However, it is also conceivable for the control loop to be arranged in another form and in this way for an adaptation unit, for example, to also be provided to adapt the idle time element if it is established that the calculated idle time-affected state variable has a constant phase shift compared to the measured state variable.

The damping unit preferably has a brake signal input. This has the advantage that the damping device can suppress the torsional oscillations as a function of a brake signal. In this way, for example, where sharp deceleration is required by the driver of the motor vehicle, the damping device can be switched to 'neutral' in order to prevent the damping device from supplying fuel to the internal combustion engine. It is also conceivable for the mechanical model of the drivetrain to be adapted to a braking intervention if, for example, an anti-skid control performs a braking intervention on a drive wheel.

In an additional embodiment according to the invention, the damping device has an input for recording a gas pedal signal, in which case the torsional oscillations can be suppressed as a function of the gas pedal. Exceptional advantages result if the change of the gas pedal position in time is taken into consideration. For example, in this way, if the drive torque of the internal combustion engine requested by the driver of the vehicle is increased, the damping device can be operated with other parameters according to an increasing gas pedal signal than is the case for a decreasing gas pedal signal. For example, the internal combustion engine with the drivetrain can have different idle times for changes of the desired torque in different directions. In addition, it can also be advantageous that, should the gas pedal suddenly be released, the damping device is taken out of operation since it can be assumed, under some circumstances that the driver would like to bring about a sharp deceleration of the motor vehicle by doing this.

The invention also includes an engine control with a damping device in one of the described embodiments. Such a motor control is particularly suitable for controlling the internal combustion engine in such a way that load peaks which increase wear and tear and jerking motions in the longitudinal direction of the vehicle are avoided.

In addition, the invention includes a damping method that can, for example, be carried out with one of the described damping devices.

Preferably, the speed (rpm) of the internal combustion engine is determined to suppress torsional oscillations in the drivetrain of the internal combustion engine and the state variable is repeatedly determined at a given interval, in which case the interval is established as a function of the speed of the internal combustion engine. For example, in the case of higher speeds of the internal combustion engine, the amount of fuel to be injected is calculated at shorter intervals than is the case for lower speeds. Therefore, it is advantageous for the state variable that reflects the torsional oscillations of the drivetrain to be calculated at shorter intervals in the case of higher speeds in order to adapt the amount of fuel to be injected.

Advantageously, the state variable is determined before each injection process. This enables an injection process to be performed which avoids the possibility of torsional oscillations being excited. Alternatively, however, it can also be sufficient to only compute the state variable, in the case of an internal combustion engine with several combustion chambers, just before each injection process of a specific combustion chamber. This has the advantage that less computing capacity is required. Under some circumstances, it can also be useful to determine the state variable at even greater intervals.

BRIEF DESCRIPTION OF THE DRAWINGS

The invention is explained below on the basis of the two accompanying drawings. They are as follows.

DETAILED DESCRIPTION OF THE PREFERRED EMBODIMENTS

Figure 1:
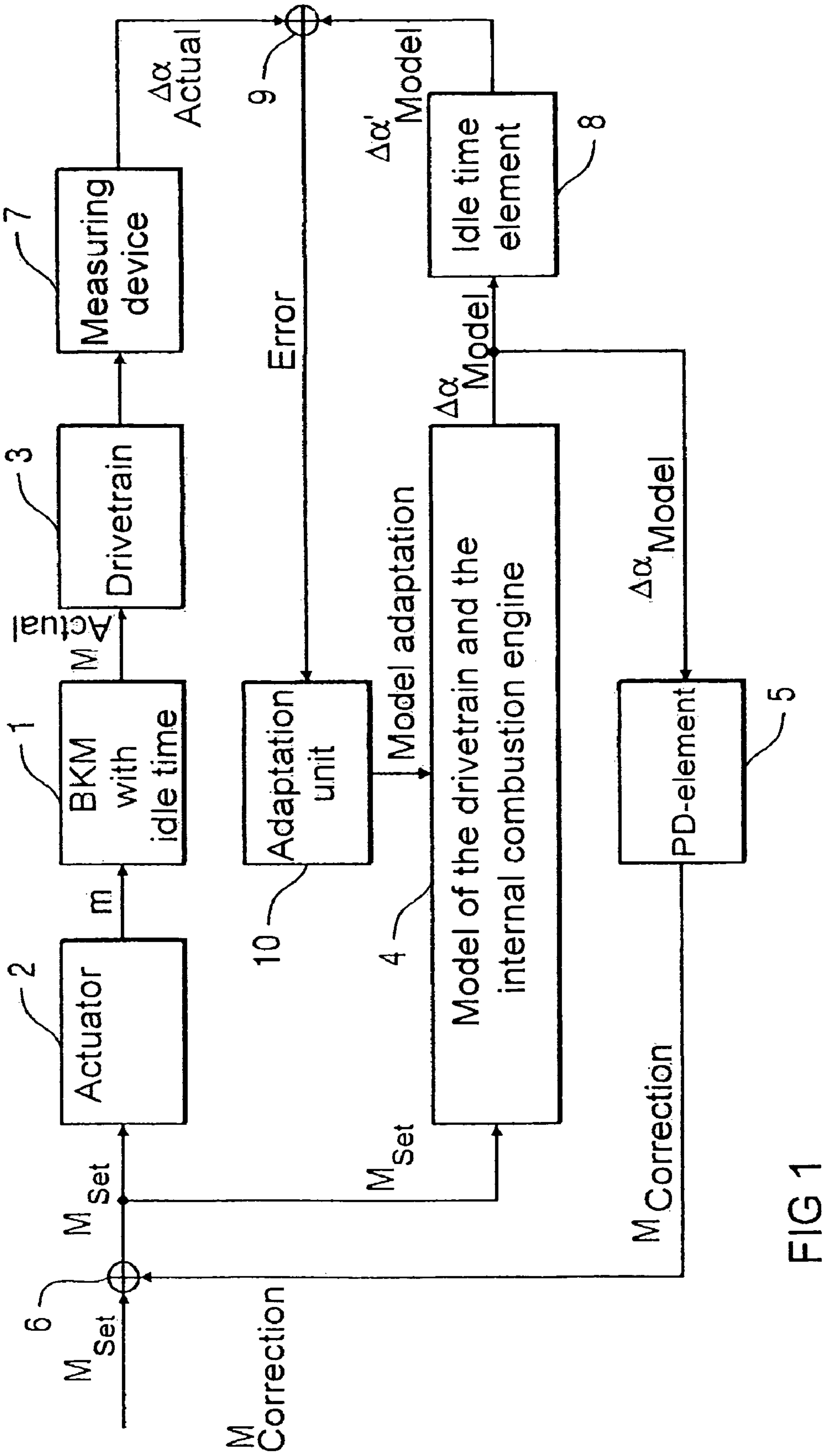
FIG. 1—a schematic diagram of a damping device according to the invention, and FIG. 2—a flowchart of a damping method according to the invention.

FIG. 1 shows a schematic of a feedback control equivalent circuit in which an actuator 2 activates an internal combustion engine 1. The drawing shows that the control variable by means of which the actuator 2 activates the internal combustion engine 1 is the amount of fuel m of an injection process. The actuator 2 can actually control additional parameters of the internal combustion engine 1, for example, the throttle valve actuation.

The internal combustion engine 1 drives the wheels of a vehicle via a drivetrain 3. The drivetrain 3 consists of a number of shafts, a gearbox, a differential and joints to transmit the torque between the individual components. The internal combustion engine 1 drives the drivetrain 3 with the torque $M_{ACTUAL}$.

The actuator 2 sets the amount of fuel m to be injected according to the specification for the drive torque $M'_{SET}$ of the internal combustion engine 1. In this case, the actuator 2 uses a control method of which various embodiments are sufficiently well known to the person skilled in the art.

The damping device consists of a predictor element 4 that contains a model of the internal combustion engine 1 and the drivetrain 3. The model is a torsional oscillator with two mass moments of inertia and a torsion spring damping element between the two mass moments of inertia. In this case, a mass moment of inertia corresponds to the mass moment of inertia of the moved parts of the internal combustion engine 1. The torsion spring damping element represents the drivetrain 3 with its components. The second mass moment of inertia of the model corresponds to the driven wheels and the mass of the vehicle that with an inertia radius corresponding to the radius of the wheels calculates the second mass moment of inertia. $M'_{SET}$ is applied as a load factor to the model. From this, the predictor element 4 calculates on the basis of the model the angular velocity of the shaft of the internal combustion engine 1 to which the drivetrain 3 is connected, and the angular velocity of the driven wheels. In this case, the model considers the set transmission ratio of the gearbox. The output of the predictor element 4 contains a signal that represents the difference $\Delta\alpha_{MODEL}$ between the described angular velocities.

The difference $\Delta\alpha_{MODEL}$ conforms to the change in the torsion over time of the drivetrain 3 between the internal combustion engine 1 and the driven wheels. In order to suppress a torsional oscillation as effectively as possible, a damping torque $M_{CORRECTION}$ is calculated according to the torsional variable $\Delta\alpha_{MODEL}$ that shows the change in the torsion in time according to a classical mechanical damping of a PD-element 5. As a result, the PD-element 5 corresponds to a known PD-controller in which case the codes for the proportional part and the differential part in tests are adapted. In this case, a greater D-portion acts in a stabilizing manner.

The correction moment $M_{CORRECTION}$ calculated by the PD-element 5 is added to torque $M_{SET}$ of the internal combustion engine 1 specified by the driver in an adding device 6. The result of this addition is the torque $M'_{SET}$ which represents the input signal for the actuator 2 and the predictor element 4. In detail, in this cycle, increasingly improved moment specifications $M'_{SET}$ can be calculated by means of a number of iterative steps.

For this reason in particular the damping unit illustrated suppresses torsional oscillations in the drivetrain 3 highly efficiently because it is not stability-critical in the same way as a control method based on idle times in the control circuit. The internal combustion engine 1 has an idle time that is primarily determined by the combustion process. The idle time of the internal combustion engine 1, at a speed of 800 revolutions per minute (rpm) is approximately 40 ms. As a result, the idle time is indirectly proportional to the rpm. On the basis of this idle time, a measurement of the mechanical response of the drivetrain 2 and the internal combustion engine 1 to the control variable m of the actuator 2 can only be carried out after this idle time.

On the other hand, the predictor element 4 with the model of the drivetrain 3 and the internal combustion engine 1 essentially has no idle time. The time interval after which the response to the input variable $M'_{SET}$ is provided at the signal output of the predictor element 4 only depends on the computing speed of the predictor element 4. Therefore, the time interval, when using normal micro-electronic components is far less than the idle time of the internal combustion engine 1. As a result, a real-time calculation of a correction moment $M_{CORRECTION}$ can be carried out.

In order to test the prediction quality and a possible model adaptation of the model to the predictor element 4, a measuring unit 7 is used to measure the actual change $\Delta\alpha_{ACTUAL}$ in the torsion of the drivetrain 3 over time. In this case, the measuring unit 7 consists of a rpm sensor in the internal combustion engine 1 that measures the speed of the internal combustion engine 1 and rpm sensors on each driven wheel. The speeds of the internal combustion engine 1 and the wheels are usually measured in any event in a motor vehicle, for example, within the framework of an anti-skid control. The measuring unit 7 calculates from the signals of the individual rpm sensors, the change $\Delta\alpha_{ACTUAL}$ in the torsion in time of the drivetrain 2. In order to be able to compare this measured change $\Delta\alpha_{ACTUAL}$ in the torsion in time of the drivetrain 3 with the calculated change $\Delta\alpha_{MODEL}$ over time, it is necessary to shift the calculated state variable $\Delta\alpha_{MODEL}$ with an idle time element 8 in time. In a comparator 9, the change $\Delta\alpha'_{MODEL}$ in the torsion of the drivetrain 3 calculated over time with the idle time element 8 and the predictor element 4 is compared with the change $\Delta\alpha_{ACTUAL}$ in the torsion of the drivetrain 3 measured in time. The result of this comparison represents the predicting error of the predictor element 4. The error serves as the input variable for an adaptation unit 10, the object of which is to adapt the model of the predictor element 4. This is done by adapting the parameters, for example, the spring and damping constants of the two-mass oscillator model. This guarantees that the predictor element 4, even in the case of changed mechanical properties of the internal combustion engine 1 and the drivetrain 3, continues to correctly predict the response of the drivetrain 3 to a drive moment $M'_{SET}$.

Figure 2:
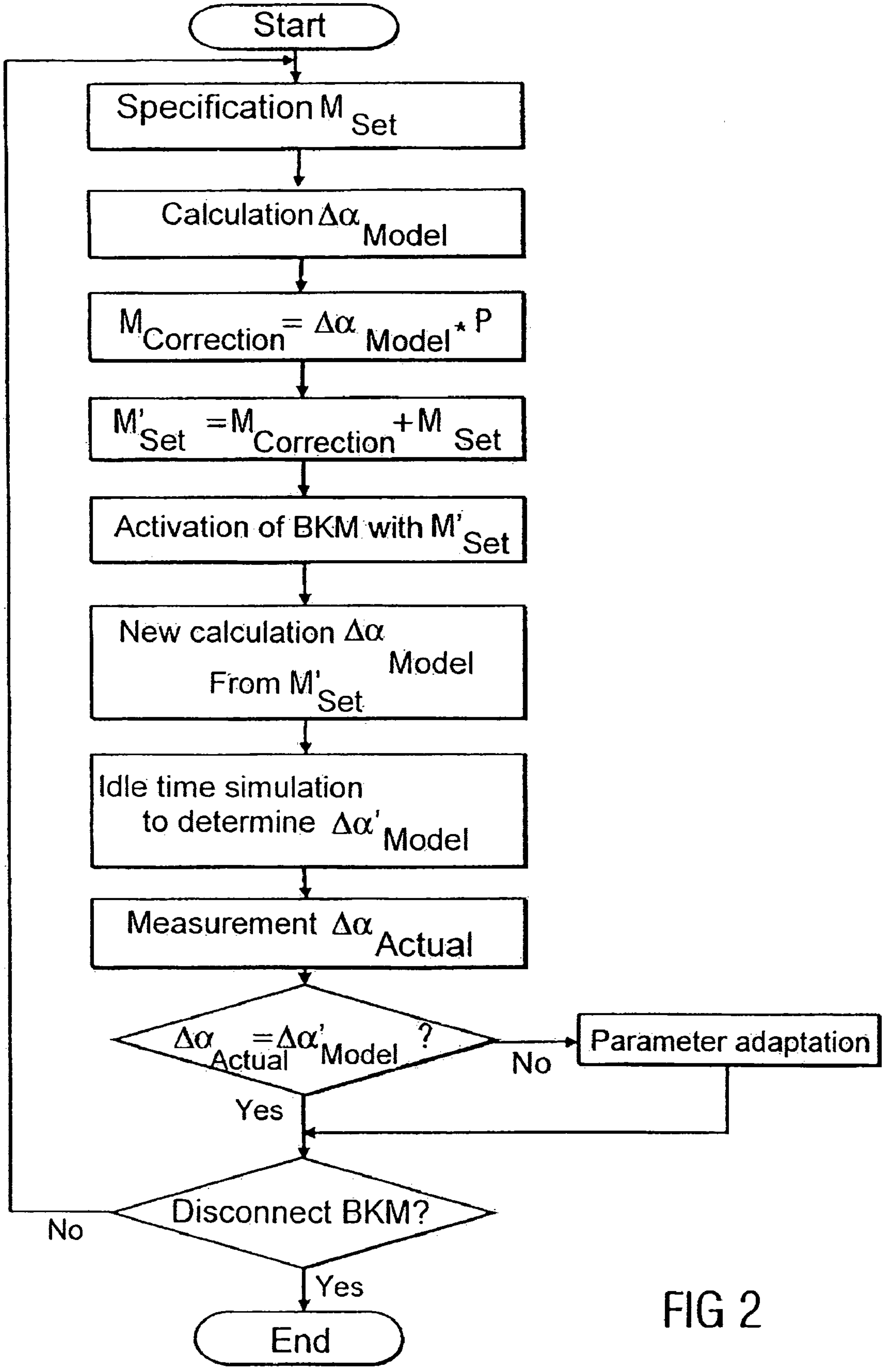

FIG. 2 shows a damping method according to the invention. It starts with the specification of a desired engine drive torque $M_{SET}$ by the driver. In the next step, the mechanical response of the drivetrain and the internal combustion engine to the desired engine drive torque $M_{SET}$ is computed. The result is the state variable $\Delta\alpha_{MODEL}$ that represents the change of the torsion of the drivetrain over time. In this case the torsion of the drivetrain is calculated between the internal combustion engine and the driven wheels.

In the next step, a correction moment $M_{CORRECTION}$ is calculated by means of a simple multiplication of the state variable $\Delta\alpha_{MODEL}$ by a constant P. Because the state variable $\Delta\alpha_{MODEL}$ represents the change of the torsion of the drivetrain over time, $M_{CORRECTION}$ conforms to a mechanical damping moment.

Thereafter, by adding the correction moment $M_{CORRECTION}$ to the given moment $M_{SET}$, the input variable $M'_{SET}$ is calculated in order to determine the supplied amount of fuel. The actuator of the internal combustion engine is activated accordingly with $M'_{SET}$ in the next step.

Subsequently the state variable $\Delta\alpha_{MODEL}$ is recalculated on the basis of the drive torque $M'_{SET}$. Accordingly, in this step, a prediction about the future actual response of the system consisting of the internal combustion engine and the drivetrain to the activation with $M'_{SET}$ is made.

Subsequently, an idle time is simulated on the calculated state variable, said idle time conforming to the actual idle time of the internal combustion engine. The result of this simulation is an idle time-affected state variable $\Delta\alpha'_{MODEL}$ that conforms to the actual change of the torsion of the drivetrain over time if the state variable was predicted correctly.

In order to check this prediction, the actual change in the torsion of the drivetrain over time $\Delta\alpha_{ACTUAL}$ is measured in the next step. If, in the case of the subsequent comparison of the measured variable with the predetermined variable it becomes evident that the prediction is incorrect, the parameters of the model will be adapted.

After the parameter adaptation or directly after the comparison, if the result of the comparison was that the prediction was correct, a check is performed to determine whether or not the internal combustion engine should be cut out. Should this not be the case, the method jumps back to the first step and requests a new desired torque $M_{SET}$ from the driver. Otherwise, the internal combustion engine will be cut out and the procedure ends.

The invention is not restricted to the embodiment and the method described above, but also includes other devices and methods insofar as these make use of the underlying idea of the invention.

We claim:

1. A damping device for suppressing torsional oscillations in a drivetrain of an internal combustion engine, comprising:

an adaptable device for determining a mechanical state model variable reproducing a torsion of the drivetrain comprising a predictor element that contains a model of the drivetrain and the internal combustion engine and determines the mechanical state model variable as a response of the drivetrain and the internal combustion engine to a control variable on the basis of the model, and an actuator for activating the internal combustion engine depending on the control variable, wherein the control variable is determined by a predefined set variable and said mechanical state model variable, a measuring device measuring a mechanical state variable of said drivetrain and the internal combustion engine; and an adaptation unit operable to adapt said adaptable device, wherein said adaptation unit receives the difference between said mechanical state variable and a time delayed mechanical state model variable.

2. The damping device according to claim 1, wherein the model included in the predictor element is essentially free from idle time whereas the internal combustion engine and the drivetrain has an idle time.

3. The damping device according to claim 1, comprising a transmission element that is connected on an input side to the predictor element and on an output side to the actuator to influence the control variable on the basis of the state variable determined with the model.

4. The damping device according to claim 3, wherein the transmission element comprises a P-element or a PD-element.

5. The damping device according to claim 1, wherein said a mechanical state variable is a change in a torsion of the drivetrain.

6. The damping device according to claim 1, wherein said adaptation unit adapts parameters of said model of the drivetrain and the internal combustion engine.

7. The damping device according to claim 6, comprising a comparator connected on the input side to an idle time element coupled with said adaptable device and the measuring device to compare the measured state variable with the calculated, idle time-affected state variable.

8. The damping device according to claim 1, comprising a brake signal input to record a brake signal, in which case the torsional oscillations are suppressed as a function of the brake signal.

9. The damping device according to claim 1, comprising a gas pedal signal input to record a gas pedal signal in which case the torsional oscillations are suppressed as a function of the gas pedal signal.

10. An engine control comprising a damping device for suppressing torsional oscillations in a drivetrain of an internal combustion engine, comprising:

an adaptable device for determining a mechanical state model variable reproducing a torsion of the drivetrain comprising a predictor element that contains a model of the drivetrain and the internal combustion engine and determines the mechanical state model variable as a response of the drivetrain and the internal combustion engine to a control variable on the basis of the model, and an actuator for activating the internal combustion engine depending on the control variable, wherein the control variable is determined by a predefined set variable and said mechanical state model variable, a measuring device measuring a mechanical state variable of said drivetrain and the internal combustion engine; and an adaptation unit operable to adapt said adaptable device according to said a mechanical state variable.

11. A damping method to suppress torsional oscillations in the drivetrain of an internal combustion engine comprising the steps of:

receiving a set variable;

controlling an actuator of an internal combustion engine by a control variable according to said set variable;

Determining by a model a mechanical state model variable representing a simulated value of the torsion generated by said internal combustion engine with said set variable, correcting said control variable by said mechanical state model variable, and Measuring the actual mechanical state variable generated by the internal combustion engine, Time delaying said mechanical state model variable, and Adapting said model according to a difference between said actual mechanical state variable and said mechanical state model variable.

12. The damping method according to claim 11, wherein the model is essentially free from idle time whereas the internal combustion engine has an idle time.

13. The damping method according to claim 11, comprising the steps of:

Determining an rpm of the internal combustion engine; and

Repeatedly determining the mechanical state model variable at a given interval, in which case the interval is determined as a function of the rpm of the internal combustion engine.

14. The damping method according to claim 11, wherein the mechanical state model variable is determined before each injection process.

15. The damping method according to claim 11, wherein the control variable is changed with a proportional dependence on the determined mechanical state model variable.

16. The damping method according to claim 11, wherein the control variable is changed as a function of the change in the determined mechanical state model variable over time.

17. The damping method according to claim 12, comprising the steps of:

Simulating the idle time of the internal combustion engine,

Calculating an idle time-affected mechanical state variable, and

Comparing the actual mechanical state variable with the calculated, idle time-affected mechanical state model variable.

18. The damping method according to claim 17, wherein the actual state variable is measured with an idle time-affected measuring device and simulates the idle time of the measuring device.

19. The damping method according to claim 17, wherein the idle time is simulated as a function of an rpm of the internal combustion engine.

20. The damping method according to claim 11, wherein torsional oscillations are suppressed as a function of a brake intervention.

21. The damping method according to claim 11, comprising the step of Disconnecting the suppression of torsional oscillations in the case of a brake intervention.

22. The damping method according to claim 16, comprising the steps of Changing a code of the proportional dependence of the control variable on the determined state model variable or on the change in the state model variable determined over time as a function of the change in a gas pedal signal over time.

* * * * *